US010669931B2

(12) United States Patent
Delp et al.

(10) Patent No.: US 10,669,931 B2
(45) Date of Patent: Jun. 2, 2020

(54) METHOD FOR DETERMINING THE COMPRESSION OF AN INTERNAL COMBUSTION ENGINE

(71) Applicant: CONTINENTAL AUTOMOTIVE GMBH, Hannover (DE)

(72) Inventors: Matthias Delp, Bad Abbach (DE); Axel Weber, Obertraubling (DE); Frank Maurer, Regenstauf (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 16/324,317

(22) PCT Filed: Aug. 7, 2017

(86) PCT No.: PCT/EP2017/069950
§ 371 (c)(1),
(2) Date: Feb. 8, 2019

(87) PCT Pub. No.: WO2018/029145
PCT Pub. Date: Feb. 15, 2018

(65) Prior Publication Data
US 2019/0218967 A1 Jul. 18, 2019

(30) Foreign Application Priority Data
Aug. 10, 2016 (DE) .......................... 10 2016 214 851

(51) Int. Cl.
*F02B 75/04* (2006.01)
*F02D 15/02* (2006.01)
(Continued)

(52) U.S. Cl.
CPC .......... *F02B 75/048* (2013.01); *F02B 75/045* (2013.01); *F02D 3/04* (2013.01);
(Continued)

(58) Field of Classification Search
CPC ...... F02B 75/048; F02B 75/04; F02B 75/041; F02B 75/042; F02B 75/044; F02B 75/045;
(Continued)

(56) References Cited

U.S. PATENT DOCUMENTS 4,834,031 A 5/1989 Katoh et al. ................ 123/48 R

FOREIGN PATENT DOCUMENTS

DE 38 25 369 C1 5/1989 .............. F02B 75/04
DE 10 2012 008 244 A1 10/2013 .............. F02B 75/04
(Continued)

OTHER PUBLICATIONS

International Search Report and Written Opinion, Application No. PCT/EP2017/069950, 18 pages, dated Dec. 12, 2017.
(Continued)

*Primary Examiner* — Jacob M Amick
(74) *Attorney, Agent, or Firm* — Slayden Grubert Beard PLLC

(57) ABSTRACT

Various embodiments include a method for operating an internal combustion engine wherein the compression is variably adjusted comprising: checking a sensor signal indicative of a compression of the engine; checking the plausibility of the signal by: ascertaining a series of corresponding values of the signal and values of the actuating variable; determining a mathematical relationship between the signal and the variable based on the series; determining a deviation between the relationship and a predetermined characteristic relationship; and determining the signal is plausible when the determined deviation is lower than a predetermined threshold value; and if the determined deviation is higher than the predetermined threshold value, adjusting operation of the internal combustion engine.

9 Claims, 3 Drawing Sheets

(51) Int. Cl.
    *F02D 41/22*     (2006.01)
    *F02D 3/04*     (2006.01)
    *F02D 43/00*     (2006.01)
    *F16F 15/24*     (2006.01)

(52) U.S. Cl.
    CPC ........... *F02D 15/02* (2013.01); *F02D 41/222* (2013.01); *F02D 43/00* (2013.01); *F16F 15/24* (2013.01); *Y02T 10/40* (2013.01)

(58) Field of Classification Search
    CPC .......... F02B 75/047; F16F 15/24; F02D 3/04; F02D 15/00; F02D 15/02; F02D 15/04; F02D 43/00
    See application file for complete search history.

(56) References Cited

FOREIGN PATENT DOCUMENTS

| | | | | |
|---|---|---|---|---|
| DE | 10 2014 012 506 B3 | 11/2015 | .............. | F02B 75/04 |
| JP | 2009144560 A | 7/2009 | .............. | F02D 15/04 |
| WO | 2007/092168 A2 | 8/2007 | .............. | F02B 75/047 |
| WO | 2016/016187 A1 | 2/2016 | .............. | F02B 75/04 |
| WO | WO-2016016187 A1 * | 2/2016 | .............. | G01M 15/06 |
| WO | 2018/029145 A1 | 2/2018 | .............. | F02D 41/22 |

OTHER PUBLICATIONS

German Office Action, Application No. 10 2016 214 851.6, 6 pages, dated Mar. 16, 2017.
Korean Office Action, Application No. 20197006558, 9 pages dated Feb. 6, 2020.

* cited by examiner

METHOD FOR DETERMINING THE COMPRESSION OF AN INTERNAL COMBUSTION ENGINE

CROSS-REFERENCE TO RELATED APPLICATIONS

This application is a U.S. National Stage Application of International Application No. PCT/EP2017/069950 filed Aug. 7, 2017, which designates the United States of America, and claims priority to DE Application No. 10 2016 214 851.6 filed Aug. 10, 2016, the contents of which are hereby incorporated by reference in their entirety.

TECHNICAL FIELD

The present disclosure relates to the technical field of internal combustion engines. Some embodiments of the teachings herein include methods for checking the plausibility of a sensor signal which is indicative of a compression of an internal combustion engine, wherein the compression can be variably adjusted by means of an actuator depending on an actuating variable, an engine controller, and/or a computer program.

BACKGROUND

In internal combustion engines with variable compression, as are described in DE 10 2012 008 244 A1 for example, engine damage and a negative influence on exhaust gas can occur when the actual compression does not correspond to the desired compression. The variable compression is usually controlled by a control circuit, wherein a sensor signal which is indicative of the compression is used as a feedback signal in order to control an actuating variable for an actuator with which the compression is adjusted.

SUMMARY

The teachings of the present disclosure may be employed for checking the plausibility of a compression which is ascertained by means of a sensor signal of this kind. For example, some embodiments may include a method for checking the plausibility of a sensor signal which is indicative of a compression of an internal combustion engine, wherein the compression can be variably adjusted by means of an actuator depending on an actuating variable, said method comprising: ascertaining (110) a series of corresponding values of the sensor signal and values of the actuating variable, determining (120) a relationship between the sensor signal and the actuating variable based on the ascertained series of corresponding values of the sensor signal and of the actuating variable, determining (130) a deviation between the determined relationship and a predetermined characteristic relationship between the sensor signal and the actuating variable, and determining (140) that the sensor signal is plausible when the determined deviation is lower than a predetermined threshold value.

Some embodiments include determining, based on the determined relationship between the sensor signal and the actuating variable, a value of the sensor signal at which the corresponding value of the actuating variable is at an extreme, determining, based on the predetermined characteristic relationship between the sensor signal and the actuating variable, a reference value of the sensor signal at which the corresponding reference value of the actuating variable is at an extreme, and determining the deviation as a deviation between the determined value of the sensor signal and the determined reference value of the sensor signal.

In some embodiments, the internal combustion engine has a multi-joint crank mechanism with an eccentric shaft, wherein the actuator is designed to rotate the eccentric shaft about its axis, and wherein the sensor signal is output by a sensor which is designed to detect the rotational angle of the eccentric shaft.

In some embodiments, the actuator is an electromechanical actuator, and wherein the actuating variable is an electric current intensity.

In some embodiments, the actuator is a hydraulic actuator, and wherein the actuating variable is a pressure.

In some embodiments, the series of corresponding values of the sensor signal and values of the actuating variable is systematically ascertained during a measuring process.

In some embodiments, the series of corresponding values of the sensor signal and values of the actuating variable is ascertained within a predetermined time window during operation.

Some embodiments include correcting the predetermined characteristic relationship between the sensor signal and the compression based on the determined deviation when the determined deviation lies between the predetermined threshold value and a further threshold value.

Some embodiments include outputting a fault message when the determined deviation exceeds the further threshold value.

As another example, some embodiments include an engine controller for a vehicle, which engine controller is designed to use a method as described above.

As another example, some embodiments include a computer program which, when it is executed by a processor, is designed to carry out the method as described above.

BRIEF DESCRIPTION OF THE DRAWINGS

Further advantages and features of the teachings of the present disclosure can be found in the description of an exemplary embodiment which follows, wherein.

DETAILED DESCRIPTION

Figure 1:
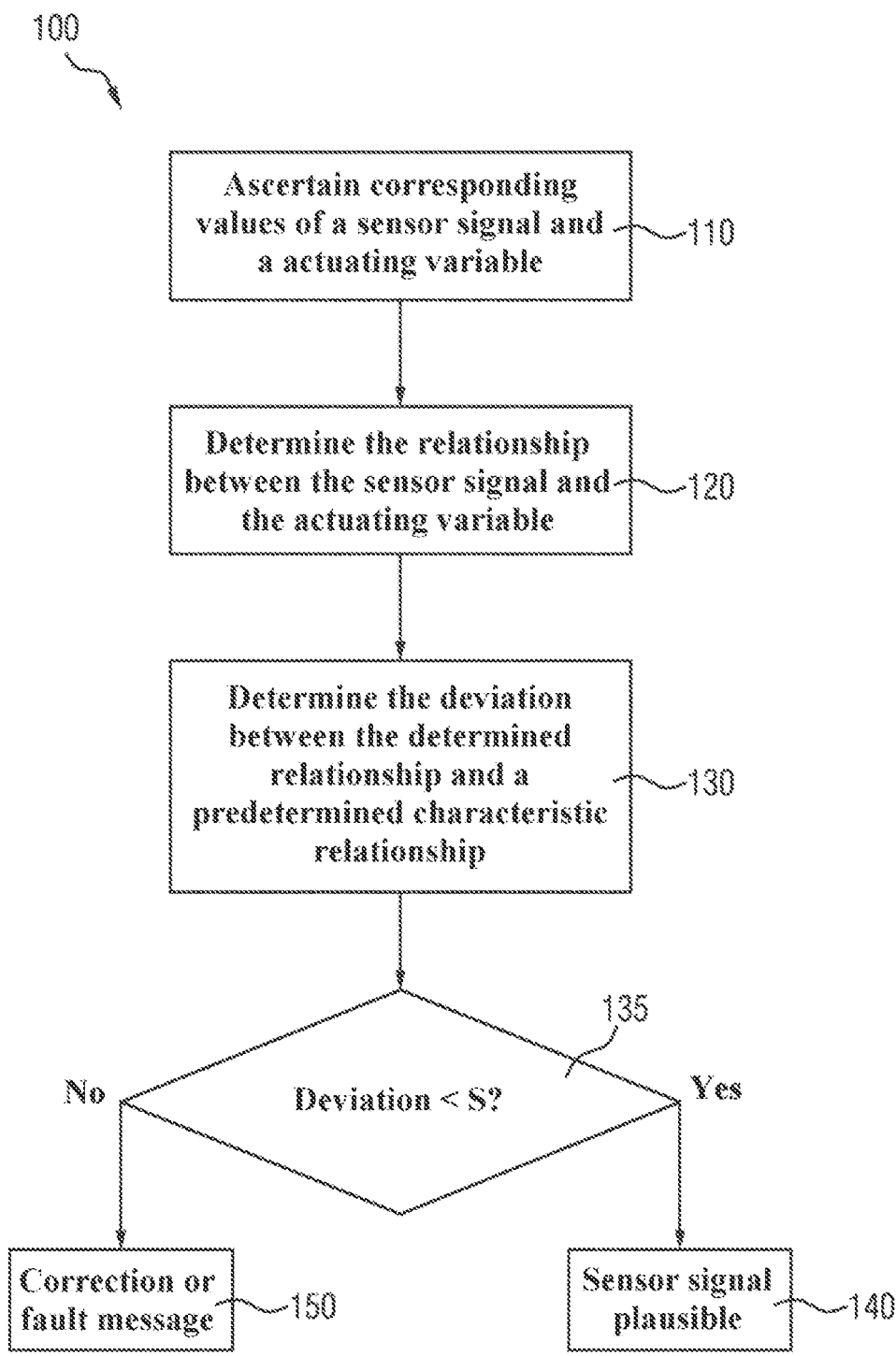
FIG. 1 shows a flowchart of a method incorporating teachings of the present disclosure.

Some embodiments include a method for checking the plausibility of a sensor signal which is indicative of a compression of an internal combustion engine, wherein the compression can be variably adjusted by means of an actuator depending on an actuating variable. In some embodiments, a method comprises the following: (a) ascertaining a series of corresponding values of the sensor signal and values of the actuating variable, (b) determining a relationship between the sensor signal and the actuating variable based on the ascertained series of corresponding values of the sensor signal and of the actuating variable, (c) determining a deviation between the determined relationship and a predetermined characteristic relationship between the sensor signal and the actuating variable, and (d) determining that the sensor signal is plausible when the determined deviation is lower than a predetermined threshold value.

The described method is based on the finding that the actuator, for reasons of geometry, has to perform certain work when a determined compression is adjusted since, with each compression (with the load remaining the same), a corresponding counterforce acts on the piston on account of the combustion, and this counterforce has to be countered by the actuator in order to maintain the compression. When the sensor signal corresponds to the actual compression, the relationship between the sensor signal and the actuating variable accordingly has to be substantially the same as a predetermined relationship.

In some embodiments, a series of corresponding values of the sensor signal and values of the actuating variable (or of said values which are associated with one another in pairs) is ascertained. A relationship between the sensor signal and the actuating variable is then determined (for example by interpolation) based on the ascertained series. A deviation between this determined relationship and a predetermined characteristic relationship between the sensor signal and the actuating variable is then determined. Provided that the determined deviation is lower than a predetermined threshold value, the sensor signal is considered to be plausible, that is to say it can be assumed that the actual compression is equal to or sufficiently close to the compression expected based on the sensor signal and that consequently neither engine damage nor a negative influence on exhaust gas will occur.

In some embodiments, the method further comprises: (a) determining, based on the determined relationship between the sensor signal and the actuating variable, a value of the sensor signal at which the corresponding value of the actuating variable is at an extreme, (b) determining, based on the predetermined characteristic relationship between the sensor signal and the actuating variable, a reference value of the sensor signal at which the corresponding reference value of the actuating variable is at an extreme, and (c) determining the deviation as a deviation between the determined value of the sensor signal and the determined reference value of the sensor signal.

In other words, the value of the sensor signal at which the corresponding value of the actuating variable according to the determined relationship is at an extreme, in particular a maximum or a minimum, is determined. Furthermore, a reference value of the sensor signal at which the corresponding value of the actuating variable according to the predetermined characteristic relationship is at an extreme, in particular a maximum or a minimum, is determined. The deviation is then determined as the deviation between the determined value of the sensor signal and the determined reference value of the sensor signal. The deviation therefore represents a difference between the actual value of the sensor signal and the reference value of the sensor signal, at which values the corresponding value of the actuating variable is at an extreme. When the respective extremes occur at different values of the sensor signal, the sensor signal does not represent a plausible indicator of the compression.

In some embodiments, the internal combustion engine has a multi-joint crank mechanism with an eccentric shaft, wherein the actuator is designed to rotate the eccentric shaft about its axis, and wherein the sensor signal is output by a sensor which is designed to detect the rotational angle of the eccentric shaft. In other words, the compression of the internal combustion engine is defined by adjusting the rotational angle of the eccentric shaft. In this case, the rotational angle is adjusted by the actuator depending on the actuating variable.

In some embodiments, the actuator is an electromechanical actuator and the actuating variable is an electric current intensity. The electromechanical actuator, for example an electric motor, may adjust the compression depending on the current intensity of the supplied electric current. The electromechanical actuator may rotate an eccentric shaft about its axis. The actuating variable is then the current intensity which is required in order to maintain a determined rotational angle for the eccentric shaft and therefore a determined compression in the internal combustion engine. The electric current intensity can therefore also be referred to as the holding current.

In some embodiments, the actuator is a hydraulic actuator and the actuating variable is a hydraulic pressure. The hydraulic actuator may adjust the compression depending on the pressure of a hydraulic fluid, in particular a liquid. The hydraulic actuator may rotate an eccentric shaft about its axis. The actuating variable is then the hydraulic pressure which is required in order to maintain a determined rotational angle for the eccentric shaft and therefore a determined compression in the internal combustion engine. The hydraulic pressure can therefore also be referred to as the holding pressure.

In some embodiments, the series of corresponding values of the sensor signal and values of the actuating variable is systematically ascertained during a measuring process. In the present context, the term "systematically ascertained" is to be understood to mean that the series of corresponding values are ascertained such that a series of settings for the compression (with the load remaining the same) is run through, wherein, at each individual setting, the value of the sensor signal and the value of the actuating variable are ascertained and recorded. A series of settings for the compression of this kind can have, for example, values at regular intervals between a compression which can be set as a minimum and a compression which can be set as a maximum (or vice versa). As an alternative, the series of settings for the compression can have a series of settings close to the compression which can be set as a maximum or as a minimum.

In some embodiments, the series of corresponding values of the sensor signal and values of the actuating variable is ascertained during operation within a predetermined time window. The corresponding values of the sensor signal and of the actuating variable may be ascertained during normal operation of the internal combustion engine. In this case, the predetermined time window is selected such that a sufficient number of settings for the compression (with the load remaining the same) are used so that a suitable series of corresponding values can be ascertained.

In some embodiments, the method further comprises correcting the predetermined characteristic relationship between the sensor signal and the compression based on the determined deviation when the determined deviation lies between the predetermined threshold value and a further threshold value. In other words, the predetermined characteristic relationship between the value of the sensor signal and the compression is recalibrated when the determined deviation lies between the threshold values, that is to say in a predetermined range. Consequently, after calibration, it can be assumed that the deviation again lies below the threshold value.

In some embodiments, the method further comprises outputting a fault message when the determined deviation exceeds the further threshold value. When the deviation is too great, a fault message is output. The fault message can then (possibly in combination with further circumstances) lead to continued driving being possible only in a limited manner or not at all.

Some embodiments include an engine controller for a vehicle, which engine controller is designed to use a method according to the first aspect and/or one of the above exemplary embodiments. This engine controller allows for the plausibility of a sensor signal which is indicative of the compression of an internal combustion engine to be checked in a simple manner.

Some embodiments include a computer program which, when it is executed by a processor, is designed to carry out the method according to the first/second aspect and/or one of the above exemplary embodiments. Within the meaning of this document, the designation of a computer program of this kind is equivalent to the concept of a program element, a computer program product and/or a computer-readable medium which contains instructions for controlling a computer system, in order to coordinate the manner of operation of a system or of a method in a suitable manner, in order to achieve the effects associated with the method according to the invention.

The computer program can be implemented as a computer-readable instruction code in any suitable programming language, such as in JAVA, C++ etc. for example. The computer program can be stored on a computer-readable storage medium (CD-ROM, DVD, Blu-ray disk, removable drive, volatile or non-volatile memory, integral memory/processor etc.). The instruction code can program a computer or other programmable devices, such as in particular a control unit for an engine of a motor vehicle, in such a way that the desired functions are executed. Furthermore, the computer program can be provided in a network such as, for example, the Internet, from which a user can download it as required. Some embodiments include a computer program, i.e. software, and also one or more specific electrical circuits, i.e. as hardware or in any desired hybrid form, i.e. by means of software components and hardware components.

It should be noted that various embodiments of the teachings herein have been described with reference to different forms. In particular, some embodiments are described by way of method and other embodiments are described by way of device. However, it will become immediately clear to a person skilled in the art on reading this disclosure that, unless explicitly stated otherwise, in addition to a combination of features which are associated with one type of subject matter, any combination of features which are associated with different types of subjects is also possible. It should be further noted that the embodiments described herein are merely a limited selection of possible variant embodiments of the teachings.

FIG. 1 is a flowchart illustrating a method 100 incorporating the teachings herein for checking the plausibility of a sensor signal (for example of a rotational angle sensor signal) which is indicative of the compression of an internal combustion engine, wherein the compression can be variably adjusted by means of an actuator (for example an electric motor), depending on an actuating variable (for example a current intensity).

A series of corresponding values of the sensor signal and values of the actuating variable is ascertained at 110. This can be performed, for example, in a systematic measuring process in which a series of values for the compression is prespecified and the resulting values of the sensor signal and of the actuating variable are ascertained and stored. As an alternative, the corresponding values (values which are associated with one another in pairs) are detected one after the other during normal operation until the required series of values has been collected.

After the series has been ascertained, a relationship between the sensor signal and the actuating variable based on the ascertained series of corresponding values of the sensor signal and of the actuating variable is determined at 120.

The deviation (for example a shift or a difference) between the determined relationship and a predetermined characteristic relationship between the sensor signal and the actuating variable is then determined at 130. Here, the predetermined characteristic relationship represents the expected relationship between the sensor signal and the actuating variable. The deviation can be determined in a more specific example as follows:

The value Wmax of the sensor signal at which the corresponding value of the actuating variable is at an extreme, for example a maximum, is determined based on the determined relationship between the sensor signal and the actuating variable. The value Wmax is therefore ultimately based on the ascertained series of values of the sensor signal and of the actuating variable.

A reference value Wmax_ref of the sensor signal at which the corresponding reference value of the actuating variable is at an extreme, for example a maximum, is then determined in a similar way but based on the predetermined characteristic relationship. The value Wmax_ref therefore represents the value of the sensor signal at which the extreme is to be expected.

The deviation is now determined as the deviation between the value Wmax and the reference value Wmax_ref, for example as the absolute difference between the two values.

At 135, the determined deviation is compared with a threshold value S and, in particular, it is determined whether the determined deviation is greater than or lower than the threshold value S.

When it is determined at 135 that the deviation is lower than the threshold value S, it is concluded at 140 that the sensor signal is plausible. That is to say, the sensor signal provides plausible information about the compression in the internal combustion engine.

When it is instead determined at 135 that the deviation is not lower than the threshold value S, either a correction is made or a fault message is output at 150. The decision as to whether a correction should be made or a fault message should be output can be made, for example, depending on whether the deviation is greater than or lower than a further threshold value. The further threshold value is greater than the threshold value S. If the deviation lies between the two threshold values, a correction can be made, for example the relationship between the value of the sensor signal and the associated compression can be corrected, in order to compensate for the deviation. This corresponds to renewed calibration of the sensor. If the deviation also exceeds the further threshold value, a fault message is output instead. The fault message then results in continued driving being possible only in a limited manner (with a lower motor power) or not at all.

Figure 2:
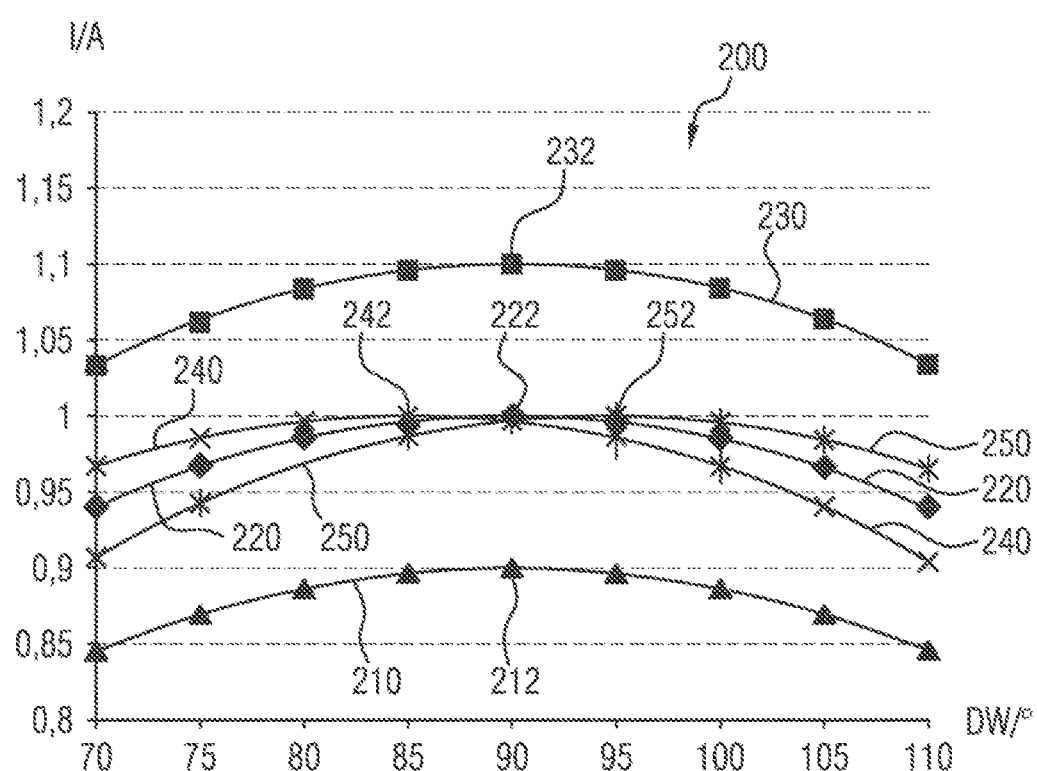
FIG. 2 shows a diagram of several rows of corresponding values of a sensor signal and of an actuating variable, which values have been ascertained in conjunction with a method incorporating teachings of the present disclosure.

FIG. 2 shows a diagram 200 of several series 210, 220, 230, 240, 250 of corresponding values of a sensor signal DW and of an actuating variable I which have been ascertained, for example in the above-described method step 110 in FIG. 1. Here, the sensor signal DW is the output signal from a rotational angle sensor which measures the rotational angle of an eccentric shaft in a multi-joint crank mechanism (such as that described below in conjunction with FIG. 3). The actuating variable I is the current intensity which has to be provided to an electromechanical actuator (electric motor) so that the rotational angle of the eccentric shaft can be maintained. In other words, I is the current intensity at which the actuator can compensate for the torque which acts on the eccentric shaft on account of the combustion in the internal combustion engine.

The curve 210 represents a series of corresponding rotational angles DW and current intensities I which have been ascertained at a low load. The curve 220 represents a series of corresponding rotational angles DW and current intensities I which have been ascertained at a medium load. The curve 230 represents a series of corresponding rotational angles DW and current intensities I which have been ascertained at a high load. The three curves 210, 220, 230 all reach the respectively maximum current intensity 212, 222, 232 (extreme) at a rotational angle DW of 90°. In the present case, this rotational angle corresponds to the reference value at which the compression should actually be at a maximum. Therefore, it can be concluded that the sensor signals 210, 220, 230 are plausible.

The behavior is different in the case of curves 240 and 250. The two curves represent a series of corresponding rotational angles DW and current intensities I which have been ascertained at the same medium load as the curve 220. As is clearly shown, the maximum current intensity 242 for the curve 240 lies at a rotational angle of approximately 85° and the maximum current intensity 252 for the curve 250 lies at a rotational angle of approximately 95°. The curve 240 therefore corresponds to a positive offset value of +5° and the curve 250 corresponds to a negative offset value of −5° which (as explained above in conjunction with FIG. 1) can either be corrected (by renewed calibration) or give rise to a fault message.

Figure 3:
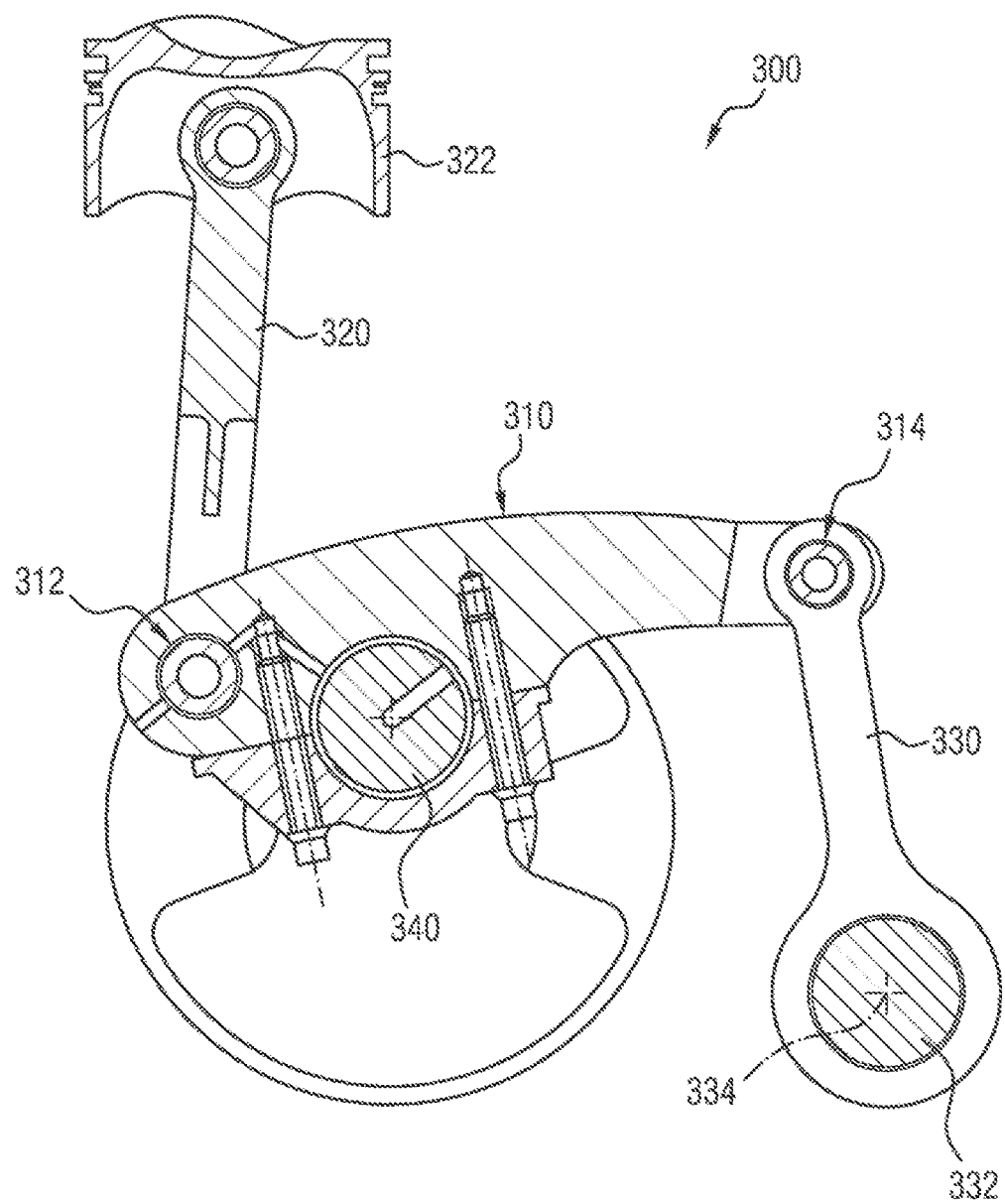
FIG. 3 shows a sectional view of a multi-joint crank mechanism with an eccentric shaft, with which multi-joint crank mechanism the above methods can be used.

FIG. 3 shows a sectional view of a multi-joint crank mechanism 300 with an eccentric shaft 332, with which multi-joint crank mechanism the above-described method 100 can be used. The multi-joint crank mechanism 300 is known as such and consists of a coupling element 310 which is connected to a piston connecting rod 320 and a piston 322 by means of a pivot joint 312 and to an articulation connecting rod 330 by means of a pivot joint 314. The articulation connecting rod 330 is mounted such that it can rotate about the eccentric shaft 332 which can be rotated about the eccentrically arranged rotation axis 334 by means of an actuator (not shown) in order to adjust the compression (by shifting the piston in the cylinder (not shown)). The rotational angle of the eccentric shaft is detected by a suitable rotational angle sensor (not shown), for example an optical or mechanical rotational angle sensor.

When the internal combustion engine is in operation, the actuator has to apply a torque to the eccentric shaft 332, which torque compensates for the torque which is applied to the eccentric shaft 332 by the working internal combustion engine, so that the set rotational angle of the eccentric shaft is maintained. This fact is used, as described above, by the method according to the invention for checking the plausibility of the output signal of the rotational angle sensor as an indication of the compression.

LIST OF REFERENCE SYMBOLS

100 Flowchart
110 Method step
120 Method step
130 Method step
135 Method step
140 Method step
150 Method step
200 Diagram
210 Curve
212 Maximum
220 Curve
222 Maximum
230 Curve
232 Maximum
240 Curve
242 Maximum
250 Curve
252 Maximum
DW Rotational angle
I Current intensity
300 Multi-joint crank mechanism
310 Coupling element
312 Pivot joint
314 Pivot joint
320 Piston connecting rod
322 Piston
330 Articulation connecting rod
332 Eccentric shaft
334 Rotation axis
340 Crankshaft

What is claimed is:

1. A method for operating an internal combustion engine wherein the compression can be variably adjusted by means of an actuator depending on an actuating variable, the method comprising:
   determining a value for a sensor signal indicative of a compression of the internal combustion engine;
   checking the plausibility of the sensor signal by:
      ascertaining a series of corresponding values of the sensor signal and values of the actuating variable;
      determining a mathematical relationship between the sensor signal and the actuating variable based on the ascertained series of corresponding values of the sensor signal and of the actuating variable;
      determining a deviation between the determined relationship and a predetermined characteristic relationship between the sensor signal and the actuating variable; and
      determining that the sensor signal is plausible when the determined deviation is lower than a predetermined threshold value; and
   if the determined deviation is higher than the predetermined threshold value, adjusting operation of the internal combustion engine.

2. The method as claimed in claim 1, further comprising:
   determining, based on the determined relationship between the sensor signal and the actuating variable, a value of the sensor signal at which the corresponding value of the actuating variable is at an extreme;
   determining, based on the predetermined characteristic relationship between the sensor signal and the actuating variable, a reference value of the sensor signal at which the corresponding reference value of the actuating variable is at an extreme; and
   determining the deviation as a deviation between the determined value of the sensor signal and the determined reference value of the sensor signal.

3. The method as claimed in claim 1, wherein:
   the internal combustion engine includes a multi-joint crank mechanism with an eccentric shaft;
   the actuator rotates the eccentric shaft about its axis; and the sensor detects the rotational angle of the eccentric shaft.

4. The method as claimed in claim 1, wherein:
the actuator comprises an electromechanical actuator; and
the actuating variable comprises an electric current intensity.

5. The method as claimed in claim 1, wherein:
the actuator comprises a hydraulic actuator; and
the actuating variable comprises a pressure.

6. The method as claimed in claim 1, further comprising systematically ascertaining the series of corresponding values of the sensor signal and values of the actuating variable during a measuring process.

7. The method as claimed in claim 1, further comprising ascertaining the series of corresponding values of the sensor signal and values of the actuating variable within a predetermined time window during operation.

8. The method as claimed in claim 1, further comprising correcting the predetermined characteristic relationship between the sensor signal and the compression based on the determined deviation when the determined deviation lies between the predetermined threshold value and a further threshold value.

9. The method as claimed in claim 8, further comprising generating a fault message when the determined deviation exceeds the further threshold value.

* * * * *